(12) United States Patent
Wong

(10) Patent No.: US 9,191,864 B2
(45) Date of Patent: Nov. 17, 2015

(54) NETWORK NODE CONTROL FOR FACILITATING RELOCATION

(75) Inventor: Shin Horng Wong, Chippenham (GB)

(73) Assignee: Alcatel Lucent, Boulogne-Billancourt (FR)

(*) Notice: Subject to any disclaimer, the term of this patent is extended or adjusted under 35 U.S.C. 154(b) by 161 days.

(21) Appl. No.: 13/639,275

(22) PCT Filed: Mar. 3, 2011

(86) PCT No.: PCT/EP2011/001048
§ 371 (c)(1),
(2), (4) Date: Dec. 18, 2012

(87) PCT Pub. No.: WO2011/124304
PCT Pub. Date: Oct. 13, 2011

(65) Prior Publication Data
US 2013/0137432 A1 May 30, 2013

(30) Foreign Application Priority Data
Apr. 6, 2010 (EP) ..................................... 10360018

(51) Int. Cl.
*H04W 36/00* (2009.01)
*H04W 60/04* (2009.01)

(52) U.S. Cl.
CPC .............. *H04W 36/00* (2013.01); *H04W 60/04* (2013.01)

(58) Field of Classification Search
CPC ....................... H04L 47/2408; H04W 52/0274
USPC .............. 455/440, 436, 573, 422.1, 450, 437, 455/434; 370/331, 332, 235, 252
See application file for complete search history.

(56) References Cited

U.S. PATENT DOCUMENTS

| | | | |
|---|---|---|---|
| 6,650,905 B1 * | 11/2003 | Toskala et al. ................ | 455/522 |
| 2007/0099617 A1 * | 5/2007 | Sipila ........................... | 455/436 |

(Continued)

FOREIGN PATENT DOCUMENTS

| | | |
|---|---|---|
| EP | 2 117 279 A1 | 11/2009 |
| EP | 2157830 A1 | 2/2010 |
| JP | 5302134 | 10/2013 |

OTHER PUBLICATIONS

Nokia Siemens Networks et al., "Requirements for Cell DTX in UMTS," 3GPP TSG-RAN WG1 Meeting #60, R1-101527, XP050418964, pp. 1-3, San Francisco, USA, Feb. 22-26, 2010.

(Continued)

*Primary Examiner* — Kiet Doan
(74) *Attorney, Agent, or Firm* — Fay Sharpe LLP

(57) ABSTRACT

A method of controlling network nodes of a wireless communications network, a network node and a computer program product are disclosed. The method of controlling networks nodes of a wireless communications network to facilitate relocation of at least a first network node from connection with a second network node to connection with one of a plurality of neighboring network nodes, at least one of said network nodes being operable to switch, in accordance with an associated predetermined switching pattern, between an active mode of connection in which wireless communication is supported and a dormant mode of connection in which wireless communication is not supported, comprises the steps of: determining when said first network node is configured to support wireless communication with said second network node; and providing information to adjust said associated predetermined switching pattern to improve a likelihood of supporting wireless communication between said first network node and said one of a plurality of network nodes to thereby facilitate said relocation. By adjusting the switching patterns, it is more likely that the first network node will be able to detect the presences of one of the plurality of network nodes. Improving the likelihood of detecting the presence of these network nodes may in turn improve the probability of a successful relocation being facilitated.

15 Claims, 6 Drawing Sheets

(56) References Cited

U.S. PATENT DOCUMENTS

2009/0268689 A1* 10/2009 Fu et al. .................. 370/331
2010/0130206 A1* 5/2010 Chin et al. ................ 455/436
2010/0142486 A1* 6/2010 Wahlqvist et al. ........... 370/332

OTHER PUBLICATIONS

Alcatel-Lucent et al., "Network Energy Saving: NodeB DRX/DTX," 3GPP TSG-RAN WG1 Meeting #60, R1-100914, XP050418514, pp. 1-6, San Francisco, USA, Feb. 22-26, 2010.

Anonymous, "Method to increase power efficiency in a mixed GSM/UMTS network," Research Disclosure, Mason Publications, vol. 471, No. 88, XP007133045, pp. 1-5, Jul. 1, 2003.

Alcatel-Lucent et al., "Mobility in the presence of NodeB DTX," 3GPP TSG-RAN WG1 Meeting #60bis, R1-101846, XP050419669, pp. 1-4, Beijing, China, Apr. 12-16, 2010.

International Search Report for PCT/EP2011/001048 dated Jul. 19, 2011.

* cited by examiner

NETWORK NODE CONTROL FOR FACILITATING RELOCATION

FIELD OF THE INVENTION

The present invention relates to a method of controlling network nodes of a wireless communications network, a network node and a computer program product.

BACKGROUND

Wireless communications networks are known. In a cellular system, radio coverage is provided to user equipment, for example mobile telephones, by geographical area. Those geographical areas of radio coverage are known as cells. A base station is located in each geographical area to provide the required radio coverage. A base station may support more than one cell providing coverage in the same geographical area. User equipment in the area served by a base station receives information and data from the base station and transmits information and data to the base station.

Information and data transmitted by the base station to the user equipment occurs on channels of radio carries known as downlink carriers. Information and data transmitted by user equipment to the base station occurs on uplink channels of radio carriers known as uplink carriers.

In known wireless telecommunications networks, user equipment can move between geographical base station coverage areas. Services provided to user equipment is typically overseen by a radio network controller (RNC). The radio network controller communicates with user equipment and base stations and determines which base station each user equipment is primarily connected to. Furthermore, the radio network controller acts to control and communicate with a base station and user equipment when the user equipment moves from the geographical area served by one base station to a geographical area served by another base station or between geographical areas served by the same base station.

The area served by a given base station typically comprises several sectors which together define a coverage area for that base station. Typically, a base station serves three sectors. Those sectors are typically served by separate antenna arrays provided on the base station. As well as controlling movement between base station coverage areas, the radio network controller also has visibility of, and communicates with, a base station and user equipment when the user equipment moves between sectors within a coverage area served by a single base station.

Movement between the sectors provided by a single base station and movement between base stations are known as a "mobility event" or a "relocation" and are overseen by the radio network controller. Typically, the extent of the involvement of the radio network controller in such mobility events or relocations will also depend upon the current state of the user equipment. For example, relocation of user equipment when in an active state (i.e. actively supporting the communication of data between the user equipment and a source base station) involves controlling the handover from the source base station to a target base station identified by a measurement report provided by the user equipment which identifies the measured characteristics of signals received from that target base station. However, relocation during an inactive state (such as an idle mode) may not require the involvement of the radio network controller to enable the user equipment to relocate to the target base station.

As the configuration and arrangement of network nodes such as base stations within the wireless communications network becomes increasingly complex, unexpected situations can occur which reduce the likelihood of a successful relocation occurring.

Accordingly, it is desired to provide an improved technique for facilitating relocation.

SUMMARY

According to a first aspect, there is provided, a method of controlling networks nodes of a wireless communications network to facilitate relocation of at least a first network node from connection with a second network node to connection with one of a plurality of neighbouring network nodes, at least one of the network nodes being operable to switch, in accordance with an associated predetermined switching pattern, between an active mode of connection in which wireless communication is supported and a dormant mode of connection in which wireless communication is not supported, the method comprising the steps of: determining when the first network node is configured to support wireless communication with the second network node; and providing information to adjust the associated predetermined switching pattern to improve a likelihood of supporting wireless communication between the first network node and the one of a plurality of network nodes to thereby facilitate the relocation.

The first aspect recognises that a network node seeking to perform a relocation may not identify suitable target network nodes for relocation if those target network nodes are performing discontinuous transmission in order to save power. This is because the network node will attempt to make measurements of signal strengths broadcasts made by nearby target network nodes to determine their potential suitability as a handover or cell reselection target. However, if those target network notes are undertaking discontinuous transmission (i.e. they switch between an active state in which they make transmissions and a dormant state in which no transmissions occur, typically to save energy), then the network node may not even identify any transmissions from a particular nearby target network node if that network node fails to make appropriate measurements during the period when the potential nearby target network node is making its transmissions. Furthermore, even if the network node performs its measurements in the period during which the potential nearby target network node makes a transmission, the strength of the signal from the potential target network node will typically be under-reported since the signal strength is averaged over time and so a low signal strength will be reported if the potential nearby target network node is dormant for a relatively long period of time.

Accordingly, a method of controlling network nodes to facilitate relocation is provided. It will be appreciated that such relocation may comprise, for example, a handover or a cell reselection. The relocation of the first network node to be facilitated may be from a source second network node to one of a plurality of neighbouring target network nodes. One or more of these network nodes may be operable in a discontinuous mode where the network node switches between an active mode and a dormant mode in accordance with a predetermined switching pattern. A assessment may be made of when a network node is configured or arranged to support wireless communications and information may be provided to adjust or alter a switching pattern to improve the probability of communications being supported between the network nodes. It will be appreciated that, as mentioned below, such information may be provided in a variety of different ways by one network node to another network node to adjust switching patterns. For example, this information may comprise instructions which change the switching patterns of the neighbouring target network nodes to align their switching patterns with each other or with a common active period. Likewise, the information may comprise instructions to the first network node to adjust its identifier and consequentially then change the switching pattern of the first network node to align with switching patterns of the neighbouring network nodes. Also, the information may comprise details provided by a network node to the first network node which defines the switching patterns of the neighbouring network nodes. Alternatively, the information may comprise the switching patterns themselves, as detected by the first network node. By adjusting the switching patterns based on this information, it is more likely that the first network node will be able to detect the presences of one of the plurality of network nodes. Improving the likelihood of detecting the presence of these network nodes may in turn improve the probability of a successful relocation being facilitated.

In one embodiment, the step of providing information causes any switching patterns of at least one of the plurality of neighbouring network nodes to be adjusted to cause those neighbouring network nodes to remain in the active mode. Accordingly, the information provided may cause switching patterns of one or more of the neighbouring network nodes to be adjusted to cause those neighbouring network nodes to remain in the active mode. By causing the neighbouring network nodes to remain in the active mode, discontinuous transmission is effectively switched off and the neighbouring network nodes will constantly transmit, thereby improving the likelihood that the first network node will detect their signals. It will be appreciated that such an approach is particularly useful when the first network node is in an active state such as, for example, a Cell_DCH state and handover to a target neighbouring network node is required in order to prevent any active call from being dropped.

In one embodiment, the method comprises the steps of: establishing, from measurement reports received from the first network node, whether a strength of a wireless signal from the second network node has failed to achieve a predetermined threshold level; and performing the steps of determining and providing information when the measurement reports indicate that a strength of wireless signals from none of the plurality of neighbouring network nodes exceeds the predetermined threshold level. Accordingly, the adjustment of the switching patterns may be avoided if at least one of the neighbouring network nodes identified in a measurement report has a sufficiently strong signal. It will be appreciated that this still facilitates relocation occurring without needing to always cause neighbouring network nodes to cease discontinuous transmission. Such an approach reduces the extent of any signalling that may be required and helps to continue to preserve power savings.

In one embodiment, the method comprises the steps of: factoring the strength of wireless signals from at least one of the neighbouring plurality of network nodes based on any switching pattern for that network node to determine whether a factored signal strength based on continued transmission in the active mode for that network node would exceed the predetermined threshold level and, if so, the step of providing information comprises providing information to adjust the associated predetermined switching pattern of that neighbouring network node. Accordingly, the switching patterns of neighbouring network nodes can be used to estimate, from the measurement reports provided by the first network node for that neighbouring base station, the likely signal strength that would be received if the neighbouring network node were to cease discontinuous transmission. Only those network nodes which would provide sufficient signal strength need then be signalled to adjust their switching patterns, with the others which would fail to achieve an appropriate signal strength even when transmitting constantly being left in the discontinuous transmission configuration. Again, it will be appreciated that this approach reduces unnecessary signalling and helps to preserve power savings.

In one embodiment, the method comprises the step of: estimating, based on at least one of position information and a strength of wireless signals from the plurality of neighbouring network nodes, a set of the plurality of neighbouring network nodes located nearest to the first network node and the step of providing information comprises providing information to adjust the associated predetermined switching pattern of the set of the plurality of neighbouring network nodes. Accordingly, a set of nearby network nodes may be determined and only those network nodes deemed to be closest to the first network node cease to operate using discontinuous transmission. Again, it will be appreciated that this helps to minimise signalling required and maintains a degree of power saving.

In one embodiment, the method comprises the step of: sending information to revert the associated switching pattern to their previous configuration of any of the plurality of neighbouring network nodes which were changed by the step of providing information and to which the first network node failed to relocate. Accordingly, any neighbouring network nodes which were instructed to cease discontinuous transmission may then be instructed to recommence discontinuous transmission if those neighbouring network nodes were not selected for relocation. It will be appreciated that this helps to restore power savings to that part of the network.

In one embodiment, the method comprises the step of: transmitting information to cause the first network node and the one of the plurality of neighbouring network nodes to which the first network node relocated to adjust their switching patterns to align with the previous configuration of the associated switching pattern of the one of the plurality of neighbouring network nodes. Accordingly, if the network node to which the first network node relocates was previously operating in a discontinuous transmission state, then both the first network node and the supporting network node may be signalled to revert back to that discontinuous state.

In one embodiment, the method comprises the step of: establishing a common pattern of periods when at least one of the plurality of neighbouring network nodes is to be in the active mode and the step of providing information comprises providing information to adjust at least one associated predetermined switching pattern to include the common pattern of periods when the at least one of the plurality of neighbouring network nodes is to be in the active mode. Hence, a common pattern of periods when each of the neighbouring networks nodes is to be in an active state is determined. The selection of this common pattern of periods may be made depending upon a variety of criteria, such as seeking to minimise any changes to the switching pattern by determining periods when many of the neighbouring network nodes are already configured to be in the active state. Accordingly, many of the existing switching patterns of the neighbouring network nodes may remain unchanged, with only some of the switching patterns of neighbouring nodes needing to be changed. Again, it will be appreciated that this helps to reduce signalling and preserve power savings.

In one embodiment, the step of providing information comprises providing information to adjust a switching pattern of the first network node to cause the first network node to be in the active mode during the common pattern of periods.

Accordingly, a switching pattern of the first network node may also be adjusted. It will be appreciated that many different mechanisms may be utilised to achieve this. By adjusting the switching pattern of the first network node to align with the common pattern of periods, the likelihood of detecting a target base station is increased.

In one embodiment, the step of providing information comprises providing information to manipulate an identifier of the first network node to cause Measurement Occasions to occur during the common pattern of periods. Accordingly, the identifier of the first network node may be manipulated or altered to cause Measurement Occasions to occur during the common pattern of periods. It will be appreciated that a Measurement Occasion is a period calculated by user equipment where the user equipment tunes to another frequency to perform measurements on cells operating in that frequency. It will be appreciated that one such way of achieving this could be utilised for network node operating in a Cell_FACH state where an identifier such as a C_RNTI or H_RNTI may be set by the core network, which may have a direct effect on the timing of the Measurement Occasion of that first network node. During such Measurement Occasions, the first network node may be operable typically to retune its receiver to a predetermined frequency to detect the presence of a neighbouring network node. By causing the Measurement Occasions to coincide with the common pattern of periods, the probability of a neighbouring base station being detected is increased.

In one embodiment, the method comprises the step of: transmitting, in an Inter-frequency Cell Information List, details of those of the plurality of neighbouring network nodes sharing a frequency band currently being utilised by the first network node for wireless communication with the second network node. Accordingly, an existing inter-frequency cell information list, which would normally contain details of base stations operating at a different frequency to the frequency being currently received by the first network node may be utilised to also include details of neighbouring network nodes which are transmitting on the same frequency currently being received by the first network node. This helps to force the first network node to also perform measurements on the frequency currently being received.

In one embodiment, the method comprises the step of: establishing paging occasions of the first network node and the step of providing information comprises providing information to adjust the associated predetermined switching patterns to include the paging occasions as periods when at least one of the plurality of neighbouring network nodes is to be in the active mode. Accordingly, paging occasions of the first network node may be established. It will be appreciated that such paging occasions may occur when the first network node is operating in a Cell_PCH or a URA_PCH mode. The paging occasions can readily be derived from the IMSI of the first network node. By causing the neighbouring network nodes to be an active mode during these paging occasions, the likelihood of the first network node detecting those neighbouring network nodes is increased.

In one embodiment, the method comprises the step of: establishing a predetermined switching pattern for at least one of the plurality of neighbouring network nodes and the step of providing information comprises transmitting an indicator indicative of the predetermined switching pattern to the first network node. Accordingly, information detailing the switching patterns of the neighbouring network nodes may be transmitted to the first network node to enable the first network node to make its measurements at the appropriate times. This helps to ensure that the first network node will always know the appropriate time to make it measurements.

In one embodiment, each indicator comprises a discontinuous transmit cycle and system frame number offset.

According to a second aspect, there is provided a network node operable to control networks nodes of a wireless communications network to facilitate relocation of at least a first network node from connection with a second network node to connection with one of a plurality of neighbouring network nodes, at least one of the network nodes being operable to switch, in accordance with an associated predetermined switching pattern, between an active mode of connection in which wireless communication is supported and a dormant mode of connection in which wireless communication is not supported, the network node comprising: determining logic operable to determine when the first network node is configured to support wireless communication with the second network node; and provision logic operable to provide information to adjust the associated predetermined switching pattern to improve a likelihood of supporting wireless communication between the first network node and the one of a plurality of network nodes to thereby facilitate the relocation.

In one embodiment, the provision logic is operable provide information to cause any switching patterns of at least one of the plurality of neighbouring network nodes to be adjusted to cause those neighbouring network nodes to remain in the active mode.

In one embodiment, the network node comprises: establishing logic operable to establish, from measurement reports received from the first network node, whether a strength of a wireless signal from the second network node has failed to achieve a predetermined threshold level; and the determining logic and the provision logic is operable to provide information to adjust the associated predetermined switching patterns when the measurement reports indicate that a strength of wireless signals from none of the plurality of neighbouring network nodes exceeds the predetermined threshold level.

In one embodiment, the network node comprises: factoring logic operable to factor the strength of wireless signals from at least one of the neighbouring plurality of network nodes based on any switching pattern for that network node to determine whether a factored signal strength based on continued transmission in the active mode for that network node would exceed the predetermined threshold level and, if so, the provision logic is operable to provide information to adjust the associated predetermined switching pattern of that neighbouring network node.

In one embodiment, the network node comprises: estimating logic operable to estimate, based on at least one of position information and a strength of wireless signals from the plurality of neighbouring network nodes, a set of the plurality of neighbouring network nodes located nearest to the first network node and the provision logic is operable to provide information to adjust the associated predetermined switching pattern of the set of the plurality of neighbouring network nodes.

In one embodiment, the provision logic is operable to send information to revert the associated switching pattern to their previous configuration of any of the plurality of neighbouring network nodes which were changed by the step of providing and to which the first network node failed to relocate.

In one embodiment, the provision logic is operable to transmit information to cause the first network node and the one of the plurality of neighbouring network nodes to which the first network node relocated to adjust their switching patterns to align with the previous configuration of the associated switching pattern of the one of the plurality of neighbouring network nodes.

In one embodiment, the network node comprises: establishing logic operable to establish a common pattern of periods when at least one of the plurality of neighbouring network nodes is to be in the active mode and the provision logic is operable to provide information to adjust at least one associated predetermined switching pattern to include the common pattern of periods when the at least one of the plurality of neighbouring network nodes is to be in the active mode.

In one embodiment, the provision logic is operable to provide information to adjust a switching pattern of the first network node to cause the first network node to be in the active mode during the common pattern of periods.

In one embodiment, the provision logic is operable to provide information to manipulate an identifier of the first network node to cause Measurement Occasions to occur during the common pattern of periods.

In one embodiment, the provision logic is operable to transmit, in an inter-frequency Cell Information List, details of those of the plurality of neighbouring network nodes sharing a frequency band currently being utilised by the first network node for wireless communication with the second network node.

In one embodiment, the network node comprises: establishing logic operable to establish paging occasions of the first network node and the step of providing comprises providing information to adjust the associated predetermined switching pattern to include the paging occasions as periods when at least one of the plurality of neighbouring network nodes is to be in the active mode.

In one embodiment, the network node comprises: establishing logic operable to establish a predetermined switching pattern for at least one of the plurality of neighbouring network nodes and the step of providing information comprises transmitting an indicator indicative of the predetermined switching patterns to the first network node.

According to a third aspect, there is provided claim a computer program product operable, when executed on a computer, to perform the method steps of the first aspect.

Further particular and preferred aspects are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further, with reference to the accompanying drawings, in which.

DESCRIPTION OF THE EMBODIMENTS

Figure 1:
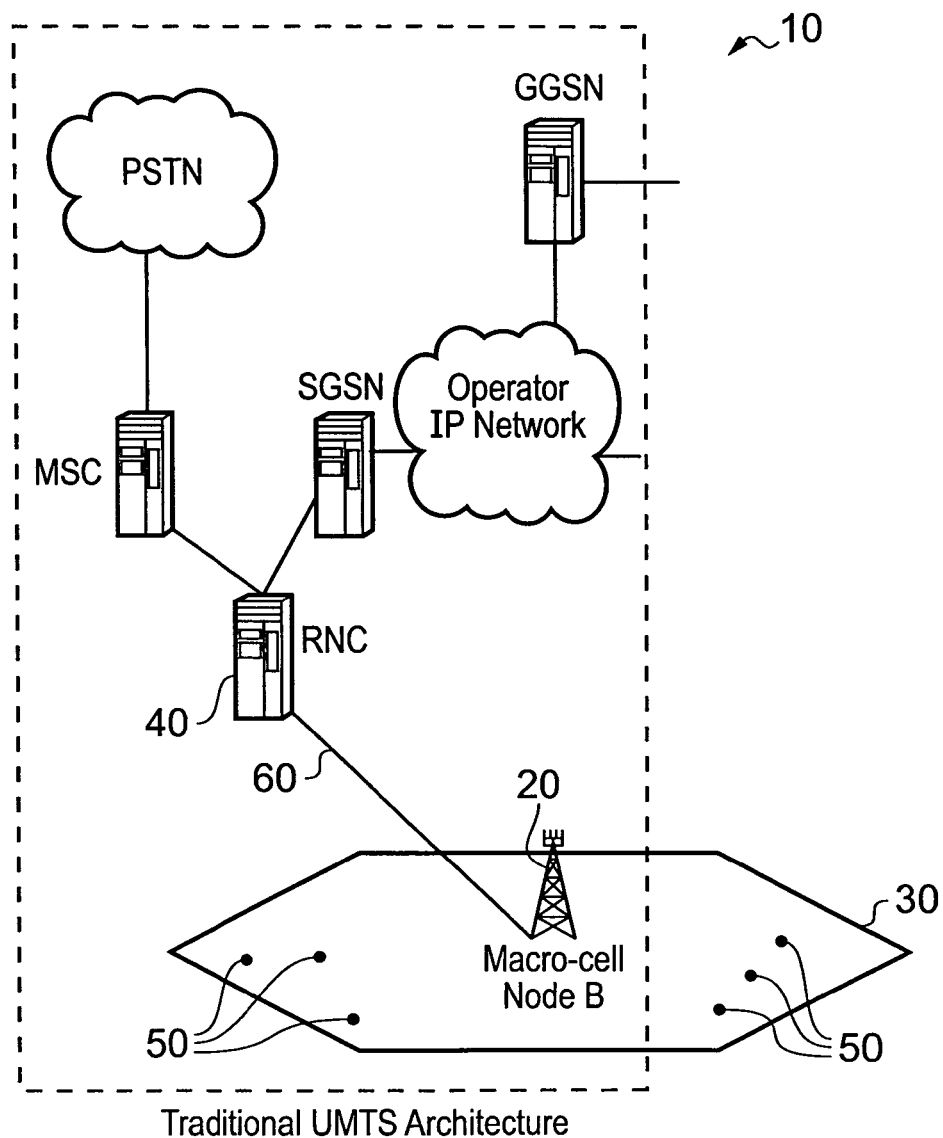
FIG. 1 illustrates the main components of a wireless telecommunications network according to one embodiment.

FIG. 1 illustrates schematically the main components of a wireless telecommunications system, generally 10, according to one embodiment. User equipment 50 roam through the wireless telecommunications system 10. Base stations 20 are provided which support areas of radio coverage 30. A number of such base stations 20 are provides and distributed geographically in order to provide a wide area of coverage to user equipment 50. When user equipment 50 is within an area 30 served by a base station 20, communications may be established between the user equipment 50 and the base station 20 over associated radio links. Each base station 20 typically supports a number of sectors within the geographical area of service 30.

Typically, a different antenna within a base station 20 supports each associated sector. Each base station 20 has multiple antennas. It will be appreciated that FIG. 1 illustrates a small subset of a total number of user equipment 50 and base stations 20 that may be present in a typical wireless communications system 10.

The wireless communications system 10 is managed by a radio network controller (RNC) 40. The radio network controller 40 controls operation of the wireless telecommunications system 10 by communicating with a plurality of base stations 20 over a backhaul communications link 60. The RNC 40 also communicates with user equipment 50 via each base station 20 and thus effectively manages a region of the entire wireless communications system 10.

User equipment 50 communicates with base station 20 by transmitting data and information on channels known as "uplink" or "reverse" channels, and base station 20 communicates with user equipment 50 by transmitting data and information on radio channels known as "downlink" or "forward" channels.

User equipment 50 may operate in a "discontinuous reception" (DRx) or "discontinuous transmission" (DTx) mode. Such modes allow user equipment 50 to save battery power when in an inactive period (for example, when user equipment 50 is in an idle state).

During discontinuous reception, user equipment 50 shuts down its reception antenna and periodically wakes up to receive possible data traffic and information, for example, paging messages, from the wireless telecommunications network 10 via data sent on downlink channels to user equipment 50 from base station 20. If the messages received by user equipment 50 in the wake-up periods are deemed to exceed a threshold, or indicate that base station 20 wishes to send more information to user equipment 50, user equipment 50 is operable to exit from the discontinuous reception mode.

Similarly, a discontinuous transmission (DTx) mode may be implemented by user equipment 50. In such a case, when in a substantially idle mode, user equipment 50 shuts down its transmitter and only wakes up periodically to transmit packets of data to the network 10 via uplink channels to the base station 20.

Furthermore, in periods of extremely low network activity, for example in a remote location, in the early hours of the morning, it is possible for a base station 20 to also implement discontinuous transmission and/or reception modes. It will be understood that switching off a base station 20 transmitter, and in particular its power amplifier, may result in a significant power saving. In order to allow a base station 20 to implement discontinuous transmission or reception it is necessary for user equipment 50 to be aware of the DTx/DRx cycle, so that they do not attempt to communicate with the network 10 whilst their primary serving base station 20 is asleep. It will be appreciated that significant power savings can be achieved if a long DTx or DRx cycle is utilised.

In order to synchronise operation of user equipment 50 in a cell 30 served by a base station 20, the base station 20 has its own reference time frames, and indicates the system time frames to user equipment 50 when they first connect. The reference time frames are not correlated between base stations 20. The reference time frames in known wireless telecommunications systems, for example, UMTS and LTE architecture systems, is achieved by use of a system frame number. A system frame number (SFN) is used to identify the framing and timing of a cell served by a base station 20. System frame number cycles through a range of values from 0 to 4095 in UMTS and 0 to 1023 in LTE.

DTx and DRx cycles can be specified by reference to a SFN. Use of SFN to control discontinuous transmission or reception cycles maximum cycle length of 4096 radio frames. Since one radio frame lasts 10 ms, this means that the maximum cycle length for a UMTS network is 40.96 seconds.

Figure 2:
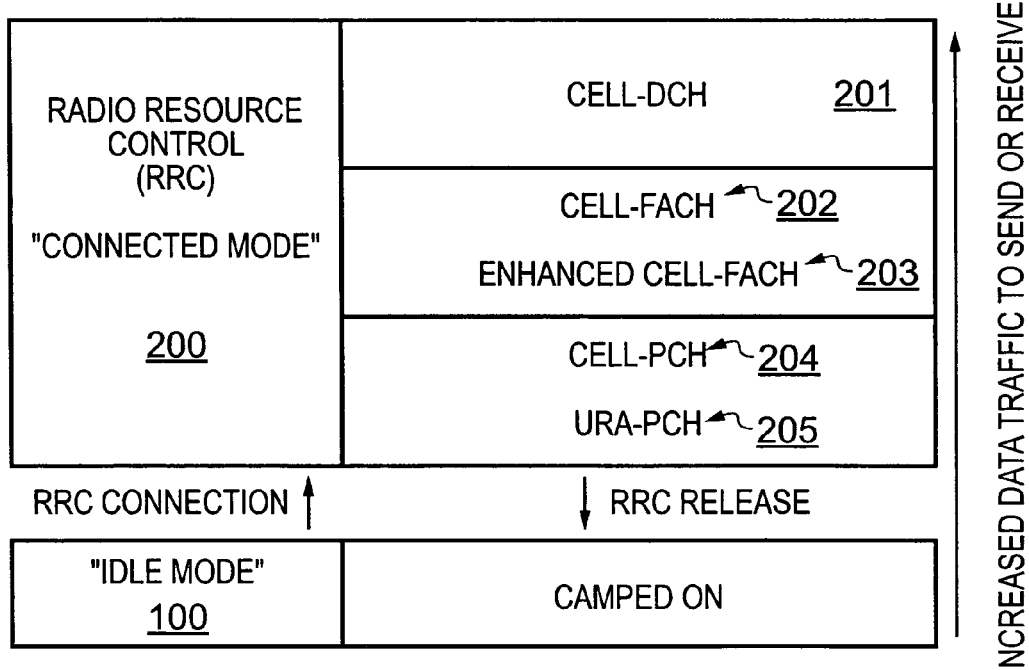
FIG. 2 illustrates a set of radio resource control states of user equipment suitable for use in the wireless telecommunications network of FIG. 1.

By way of background, FIG. 2 illustrates schematically various radio states in which user equipment 50 may operate in a UMTS telecommunications network. On initial turning on of user equipment 50 in a cell 30, it will typically be in "idle mode" 100. Once it synchronises and attaches itself to a base station 20, it gains a radio resource control (RRC) connection and is referred to as being in connected mode 200. User equipment 50 in idle mode does not have a Radio Resource Control (RRC) connection.

If user equipment 50 is RRC connected 200, it can be in one of five different RRC states: Cell_DCH (201), Cell_FACH (202), Enhanced Cell_FACH (203), Cell_PCH (204) and URA_PCH (205) states.

User equipment 50 typically moves into Cell_DCH (201) state when its traffic is high, since in such a state the user equipment 50 is allocated a dedicated channel on which to transmit and receive data from base station 20. In UMTS network architecture, user equipment 50 can be in Cell_DCH state, where it is expected to have high volume of traffic.

Base station power saving modes implementing DRx/DTx are currently not intended for use with user equipment 50 operating in a Cell_DCH state.

Legacy user equipment operating in a non-Cell_DCH state (e.g. Enhanced Cell_FACH, Cell_PCH, URA_PCH and Idle mode) may only be able to perform DRx. Legacy user equipment typically transmits on a Random Access Channel (RACH) when operating in either Enhanced Cell_FACH or Cell_FACH states. Transmission on a RACH can occur at any time, and as a result, it is difficult for a base station 20 to turn off its receiver whilst legacy user equipment is operating in those states. However, data traffic transmitted on a RACH is expected to be transmitted several times by user equipment 50 trying to transmit data to a base station 20, and hence it is possible for a base station 20 to perform short DRx patterns with some probability of capturing messages and data sent by legacy user equipment on a RACH. It will be appreciated that the particular configuration of the short cycles can be configured by an operator.

The following description describes different techniques for facilitating relocation of user equipment. The first three techniques relate to techniques for legacy user equipment, whilst the final two techniques relate to new user equipment having additional functionality.

Legacy User Equipment

Handover

Handover is performed for user equipment when operating in Cell_DCH. Base station DTx/DRx is not supported in the Cell_DCH state since high data throughput is expected of the user equipment when in this state. The source serving base station or node B supporting user equipment in the Cell_DCH state will therefore not be in the DTX/DRX mode. As mentioned above, the user equipment periodically sends measurement reports to the core network. Using these measurement reports, the core network will know whether user equipment reception deteriorates to below a handover threshold and whether there are any suitable neighbouring base stations to handover to. In this embodiment, the core networks transmits information to "wake up" a neighbouring base station that is performing DTx so that this base station exits DTx to thereby enable the user equipment to perform accurate pilot measurements on this base station. The core network will typically only wake-up a base station from DTx mode if none of the measurable neighbouring base stations provide pilot signals above a predetermined threshold. This helps to avoid waking up base stations operating in the discontinuous mode unnecessarily. Furthermore, the core network will wake-up only the relevant nearby discontinuous mode base stations. This is achieved by estimating the user equipment location based on neighbouring bases station measurements and the location of those base stations.

Figure 3:
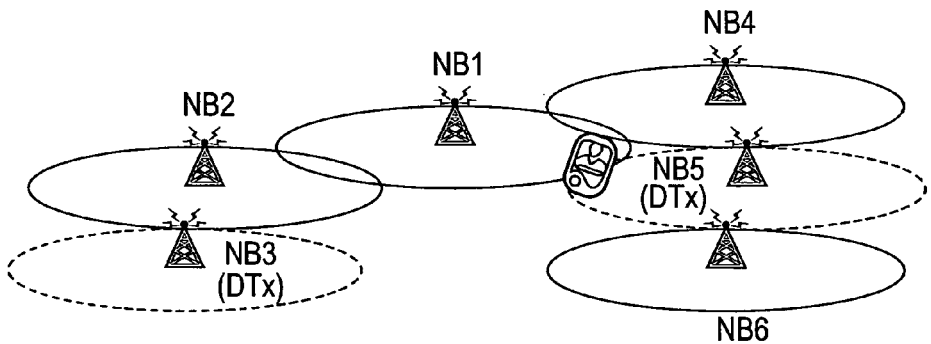
FIG. 3 shows an example arrangement of base stations neighbouring user equipment seeking to perform handover when operating in the Cell_DCH mode.

FIG. 3 shows an example arrangement of base stations neighbouring user equipment seeking to perform handover when operating in the Cell_DCH state. The user equipment is attached to base stations NB1. Base stations NB3 and NB5 are operating in the discontinuous mode. The measurement reports received from the user equipment show that the pilot signal from base stations NB4 and NB6 are higher than that from base station NB2 and, hence, the core network can estimate that the user equipment is likely to be closer to base station NB5 than it is to base station NB3. Accordingly, the core network will only wake-up base station NB5 from operating in the discontinuous mode by transmitting information to the base station which adjusts the switching pattern of the base station NB5 to cause it to remain in the active mode.

The user equipment will typically average the neighbour base station signal strength measurements over time. It is possible that the user equipment may be able to measure the pilot of a base station operating in the discontinuous mode but, due to the interruptions in the pilot, the average signal strength reported will be unrepresentatively low. Accordingly, the core network will factor the interruptions into the user equipment's measurement report based on knowledge of the switching pattern for the base station when operating in the discontinuous mode to work out whether a base station operating in the discontinuous mode has the strongest signal and wakes up only the base stations that are likely to be handed over to. The accuracy of these assessments can be further aided if the user equipment also reports its position to the network using, for example, GPS.

Since the core network decides which base station the user equipment is to handover to based on the measurements reports received, the core network is then able to inform the base stations that have been woken up that they are not the hand over targets so that they can resume their discontinuous mode. When the user equipment hands over to the target base station, this target base station may not be able to resume discontinuous mode since the user equipment is in the Cell_DCH state. However, the core network is able to determine the user equipment downlink traffic and so can decide whether the user equipment can be served in the Cell_FACH state, thereby allowing the target base station to revert to its discontinuous mode. It will be appreciated that since base stations may need to exit discontinuous mode, the core network should minimise handovers to base stations in the discontinuous mode to maximise energy savings.

Figure 4:
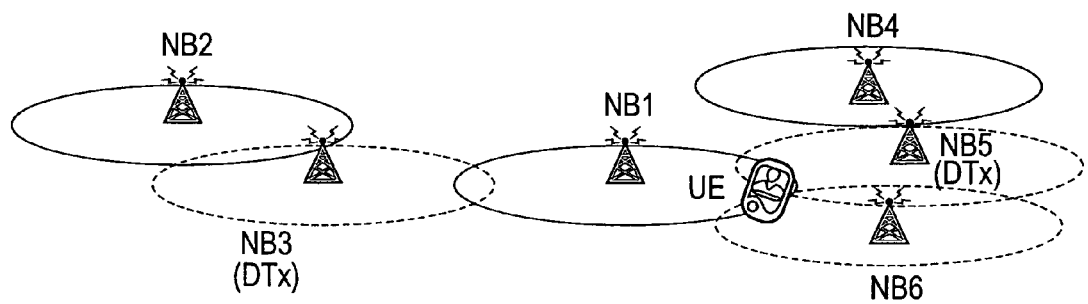
FIG. 4 illustrates another example arrangement of base stations neighbouring user equipment seeking to perform handover when operating in the Cell_DCH mode.

FIG. 4 illustrates a slightly different arrangement of the network and provides an example of the operation of a relocation of legacy user equipment when in the Cell_DCH state. The user equipment is in the Cell_DCH state and is initially attached to base station NB1. It constantly measures its neighbouring base stations (i.e. performs measurements of the pilot signals from base stations NB2, NB3, NB4, NB5 and NB6) and reports these measurements to the core network. As the user equipment moves away from base station NB1, the core network determines that the user equipment will need to handover to another base station. The measurement reports received from the user equipment are as follows:

NB2 signal=−110 dBm
NB3 signal=−150 dBm
NB4 signal=−100 dBm
NB5 signal=−140 dBm
NB6 signal=−142 dBm In this example, the minimum signal required from a cell (or base station) before a user can handover is −95 dBm. Unfortunately, in this case, none of the signals received from the base stations are strong enough. However, the network knows that base stations NB3, NB5 and NB6 are operating in the discontinuous mode and, hence, their measured results are lower due to the user equipment averaging their signal strengths over time. The network therefore factors in the discontinuous switching pattern to estimate what the signal strengths would be if the base stations were not operating in the discontinuous mode. This gives the following estimations:

NB2 signal=−110 dBm
NB3 signal=−105 dBm
NB4 signal=−100 dBm
NB5 signal=−90 dBm
NB6 signal=−93 dBm The signal from base station NB4 is stronger than that of base station NB2. Also, the core network knows that base stations NB5 and NB6 are in the vicinity of base station NB4, whereas base station NB3 is in the vicinity of base station NB2. Accordingly, the network estimates that base stations NB5 and NB6 are better candidates for handover than base station NB3. Hence, the network decides not to wake-up base station NB3 from its discontinuous mode. The network has a choice of waking up either base stations NB5 or NB6, since both of them are in the vicinity of base station NB1. In this example, the network determines that base station NB5 has a longer discontinuous cycle (i.e. a shorter wake-up period) than that of NB6. To maximise the energy savings, the network therefore decides to transmit information to wake-up base station NB6, even though base station NB5 has higher estimated signal strength.

The user equipment then measures the signal strength from base station NB6 as being above −95 dBm and reports this as a handover target. It will be appreciated that although base station NB6 has to exit from its discontinuous mode, the user equipment that is serves can still remain in any discontinuous mode since the base station NB6 need not transmit any data in what used to be its dormant or sleep period (only the pilot needs to be transmitted for measuring purposes). Upon receiving a measurement report from the user equipment identifying base station NB6 as a signal which exceeds the −95 dBm threshold, the network hands over the user equipment from base station NB1 to base station NB6.

Since the user equipment is in the Cell_DCH state, base station NB6 at least initially needs to exit completely from its discontinuous mode to serve this user equipment. As mentioned above, should the traffic demands of the user equipment reduce, the network may signal both the base station NB6 and the user equipment to transition to the Cell_FACH state. Accordingly, it could be seen that the switching pattern of the base station NB6 is adjusted to improve the likelihood of its pilot signal being measured by the user equipment to thereby facilitate relocation of the user equipment through a handover.

Legacy User Equipment

Cell Reselection

Cell reselection is performed when the user equipment is in the Cell_FACH, Cell_PCH, URA_PCH and idle states. As will be described in more detail below, one technique is utilised when in the Cell_FACH state, whereas another technique is utilised for each of the Cell_PCH, URA_PCH and idle states.

Reselection in Cell_FACH

In Cell_FACH, the user equipment performs inter-frequency measurements during a predetermined Measurement Occasion. As will be described in more detail below, the Measurement Occasion is defined by a user equipment identifier which is allocatable by the core network. The Measurement Occasion is a period of one or more radio frames where the user equipment stops receiving signals from its serving base station on the serving frequency carrier and retunes its receiver to another frequency to measure the pilot signals from a neighbouring base station operating on a different frequency carrier. The Measurement Occasion is periodical and, as mentioned below, is determined by the network.

This embodiment transmits information which aligns the user equipment Measurement Occasion with a predetermined "wake-up" time for those neighbouring base stations that are in the discontinuous mode. Although the Measurement Occasion is intended for measuring inter-frequency base stations, it can be utilised for intra-frequency cells by including the intra-frequency cells in the inter-frequency cell info list broadcast to the user equipment by the core network. Accordingly, the inter-frequency cell info list will then contain a set of intra-frequency and inter-frequency cell identifiers that the user equipment needs to measure. The core network only needs to include an intra-frequency cell if the base station supporting that cell is in the discontinuous mode.

In order to align the user equipment measurement with the switching patterns of the neighbouring base stations operating in the discontinuous mode, the core network needs to know the switching pattern of the base stations operating in the discontinuous mode and the difference in system frame number between the base stations. In R1-100914, the switching pattern may not be a simple cycle. However, the Measurement Occasion may be a simple periodic cycle. Hence only a simple switching pattern of each base station needs to be signalled. This simple switching pattern can be a subset of the base station switching pattern. The switching patterns among the base stations are likely to be different and may not coincide, especially when the system frame number among the base stations are not synchronised. However, legacy user equipment has only one Measurement Occasion cycle and it needs to measure all of its neighbouring cells pilots in order to make a cell reselection decision.

Figure 5:
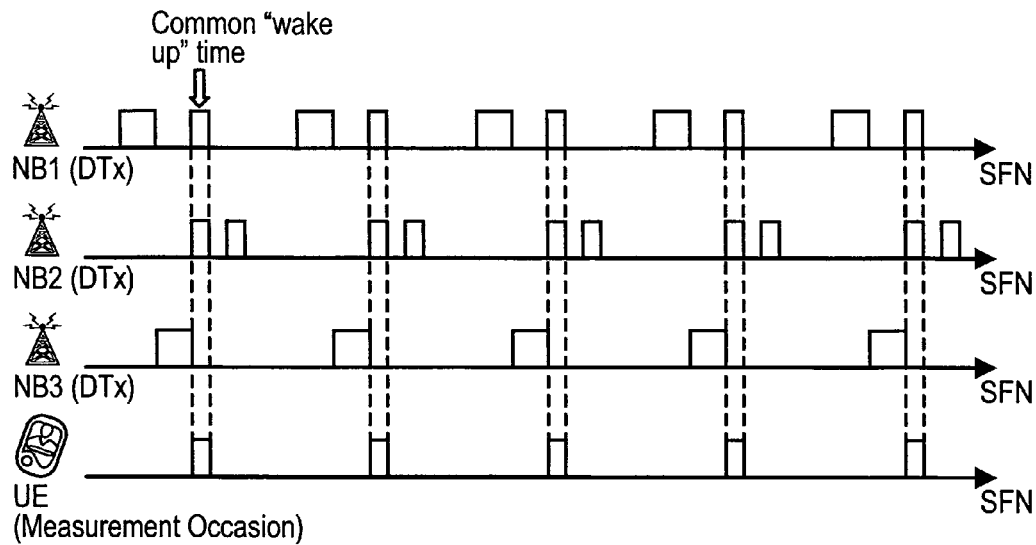
FIGS. 5 and 6 illustrate the selection of a common wake-up time for base stations neighbouring user equipment seeking to perform cell reselection when operating in the Cell_FACH mode.

An example of this is shown in FIG. 5, where all three base stations have a different switching pattern and the user equipment's Measurement Occasion coincides with part of the switching patterns of base stations NB1 and NB2. Here, the user equipment can only measure base stations NB1 and NB2 during its Measurement Occasion. To address this, information is transmitted by the core network so that all neighbouring base stations are forced to have a common wake-up time (after taking into account the differences in system frame number) in addition to their switching pattern. The core network finds the most common wake-up time among the neighbouring base stations and selects this as the common wake-up time. In this way, the amount of additional wake-up time required is minimised.

Figure 6:
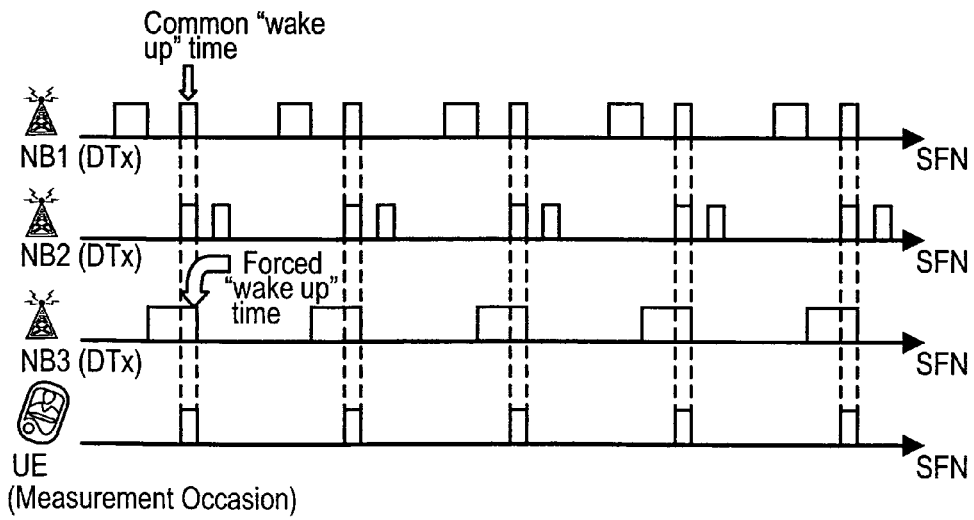

In the example shown in FIG. 5, base stations NB1 and NB2 have a common wake-up time as indicated by the arrow. As shown in FIG. 6, the network applies the common wake-up period for base stations NB1 and NB2 as a common wake-up time for all neighbouring base stations and forces the remaining base station, base station NB3, to wake-up during this period. The Measurement Occasion can thus be aligned with this forced common wake-up time, thereby allowing the user equipment to measure all base stations pilots. In addition to the common forced wake-up period cycle (DTX_force_cycle), the network determines an offset (SFN_offset) for each base station. The SFN offset taken into account the base stations system frame number difference with the common wake-up period, which is different for each base station.

It will be appreciated that enforcing a common wake-up period may reduce the energy saving gains of base stations operating in the discontinuous mode, especially if the common wake-up period does not coincide with the base station's existing switching pattern. However, the core network may choose not to enforce the common wake-up period for some base stations operating in the discontinuous mode, especially if this forced common wake-up period does not coincide with the base station's switching pattern. For example, the core network may decide not to add another wake-up period to a base station's switching pattern if this base stations coverage is also covered by another base station.

For Pre-Release 7 user equipment (without Enhanced Cell FACH), the Measurement Occasion occurs at the SFN if the SFN fulfils the following Equation:

$$SFN\,div\,N = C\_RNTI \bmod M\_REP + n * M\_REP \quad \text{Equation 1}$$

where: N is the transmission time interval (TTI—in number of 10 ms radio frames) of the FACH having the largest TTI on the selected Secondary Common Control Physical Channel (SCCPCH), this determines the length (in radio frames) of the Measurement Occasion; C_RNTI is a 16 bit identity of the UE at the cell level which ranges from 0 to 65535; M_REP is the Measurement Occasion cycle length and is calculated as M_REP=$2^k$, where k is the FACH Measurement Occasion cycle length coefficient which is broadcast to the user equipment; and n=0, 1, 2, . . . as long as SFN is below its maximum value of 4095.

As observed in Equation 1, all the variables can be controlled by the core network. The base station can align the user equipment Measurement Occasion by ensuring that C_RNTI mod M_REP is the same for all user equipment. The Measurement Occasion can then be aligned to the common "wake-up" period by setting each user equipment's C_RNTI such that Equation 2 is met.

$$C\_RNTI \bmod M\_REP = SFN\_Offset + Additional\_Offset \quad \text{Equation 2}$$

where: Additional_Offset is 0, if not required.

Also M_REP is set to be an integer multiple of DTx_Forced_Cycle as in Equation 3.

$$M\_REP = m * DTx\_Forced\_Cycle, m=1,2,3,4, \quad \text{Equation 3}$$

For Rel-7 onwards for user equipment in Enhanced Cell FACH, a Measurement Occasion occur if the SFN fulfils Equation 4.

$$SFN = H\text{-}RNTI \bmod M\_REP + n * M\_REP \quad \text{Equation 4}$$

Where: H-RNTI is a 16-bit HSDPA identity for the user equipment and is assigned by the network. Similarly to Equation 2, all the variables in Equation 4 can be controlled by the network and the Measurement Occasion can be aligned if each user equipment's H-RNTI fulfils Equation 5 and that Equation 3 is met.

$$H\text{-}RNTI \bmod M\_REP = SFN\_Offset + Additional\_Offset \quad \text{Equation 5}$$

Figure 7:
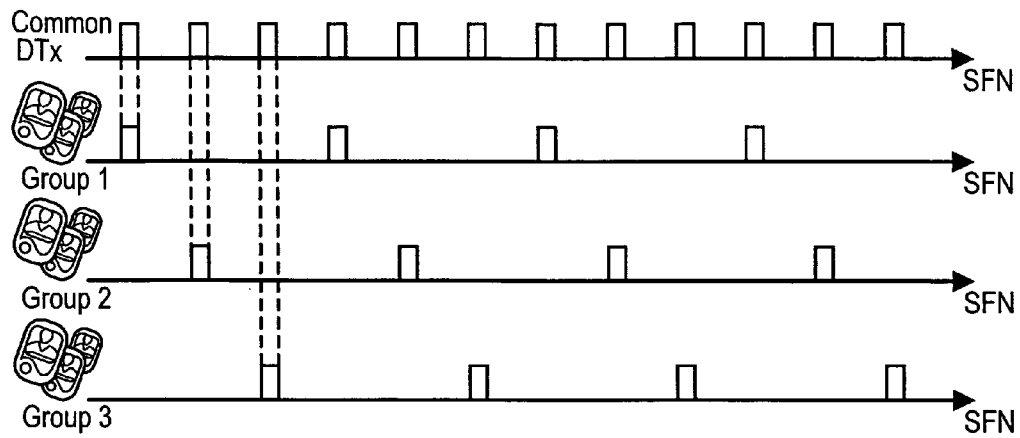
FIG. 7 shows user equipment grouped into groups.

The Measurement Occasion is initially arranged to be a function of the user equipment's C_RNTI or H-RNTI so that it minimises the number of user equipment from tuning off from the current frequency at the same time. Hence, it will be appreciated that the user equipment's C_RNTI or H-RNTI are examples of information provided to adjust switching patterns. However, in this embodiment, the core network requires user equipment to tune out at the same time in order to align their Measurement Occasion with the forced common wake-up period. This has little impact on the base station's throughput since only user equipment in Cell_FACH (or enhanced Cell_FACH) perform the Measurement Occasion. However, given that the core network can manipulate the C-RNTI and H-RNTI of user equipment, the user equipment can be grouped such that each group's Measurement Occasion is an offset of another group by using the additional_offset variable in equations 2 and 5. This requires that the variable "n" in equation 3 equals the number of groups. An example of this is shown in FIG. 7 where the user equipment are grouped into three groups. The Measurement Occasion of each group is a fixed offset of the other groups, but in each group the Measurement Occasion coincides with part of the forced common wake-up period. In this example, M=3 in Equation 3.

When user equipment reselects to another cell, it will send out a cell update to that cell (or base station) to indicate that it is now attached to this cell. The network will send a cell update to confirm. Since the user equipment, upon entering the new cell (base station coverage area) is not aware that it needs to be in the discontinuous mode, the cell update message can be sent at any time. Given this situation, the base station performing this continuous transmit cannot perform discontinuous receive so that it can capture any possible updates. In the cell update confirm message the core network should direct the user equipment to either the Cell_FACH discontinuous receive or Cell_PCH state depending upon the user equipment capability.

Figure 8:
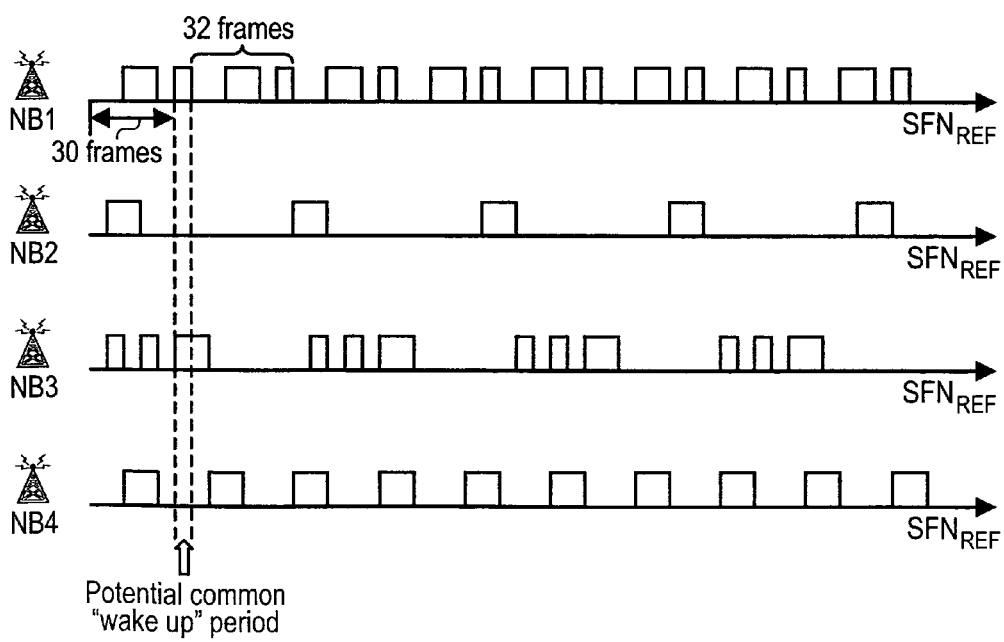
FIG. 8 illustrates an example arrangement of neighbouring base stations adjusting their switching patterns to align with a common wake-up period for user equipment in the Cell_FACH mode.

FIG. 8 illustrates an example arrangement of four neighbouring base stations (NB1, NB2, NB3 and NB4) adjusting their switching patterns to align with a common wake-up period for user equipment in the Cell_FACH state. In this example, the following system frame number offsets relative to a reference point $SFN_{REF}$ are provided:

| Node B | SFN – SFN$_{Ref}$ |
|---|---|
| NB1 | 232 |
| NB2 | 145 |
| NB3 | 21 |
| NB4 | 786 |

This means that, for example, when base station NB1 SFN is 232, its SFN as seen by a reference point SFN$_{REF}$ is 0 (i.e. the difference between NB1 SFN and SFN$_{REF}$). It will be appreciated that it is possible that the SFN difference may result in a none-integer number, that is the SFN difference between base stations may not be an integer multiple of radio frames. In this case, a floor function can be applied to the results (i.e. floor (SFN−SFN REF)).

Figure 9:
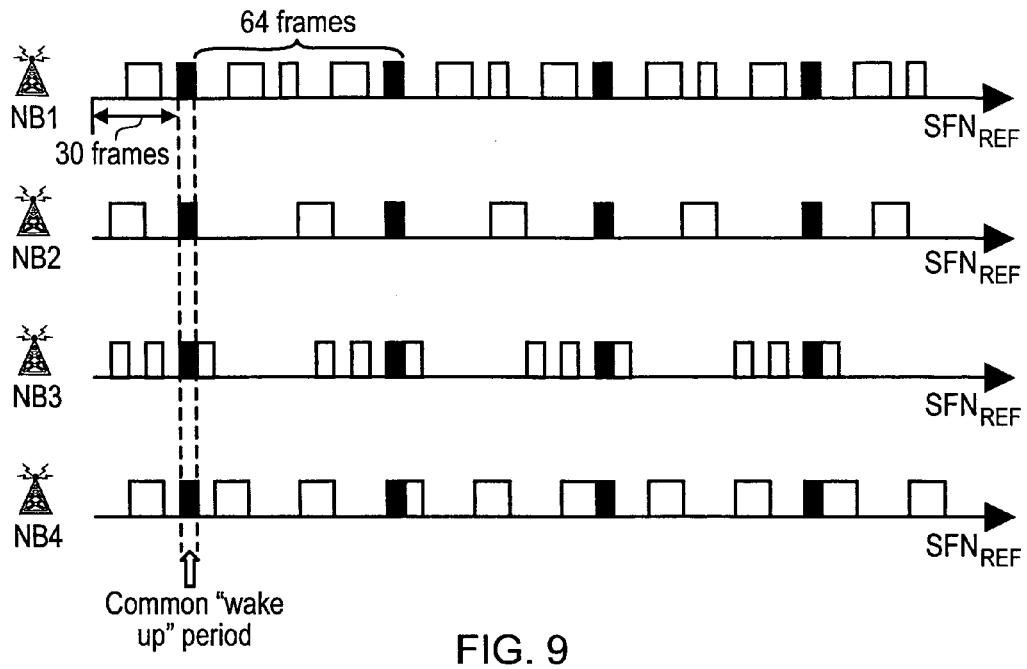
FIG. 9 illustrates an example arrangement of switching patterns adjusted to align with a common wake-up period for user equipment in the Cell_FACH mode.

The discontinuous transmit pattern for each base station is shown in FIG. 8, where the X axis is SFN$_{REF}$ so that the non-synchronised SFNs are plotted on a common reference point. A common wake-up period is chosen such that it overlaps as much as possible with all the base station discontinuous transmit patterns and this is indicated in FIG. 8 with an arrow. The start of this common wake-up period is at SFN$_{REF}$=30 (or 30 radio frames). The network decides that the common wake-up period cycle, DTX_forced_cycle=64 frames. The resultant common wake-up period is shown in FIG. 9 and is indicated with shading. The SFN offset for each base station can be calculated as in Equation 7:

$$\text{SFN\_Offset}=(\text{SFN}-\text{SFNRef}+\text{WakeUp\_Offset})\bmod \text{DTx\_Forced\_Cycle} \quad \text{Equation 7}$$

where, WakeUp_Offset=30 is the start of the common "wake up" period.

Using Equation 7, the SFN_Offset for each base station is calculated as follows and they are sent to their respective base station:

| Node B | SFN_Offset |
|---|---|
| NB1 | 6 |
| NB2 | 47 |
| NB3 | 51 |
| NB4 | 48 |

Given the SFN_Offset, the base station will determine the required Measurement Occasion. For example, assume base station NB1 has four user equipment in Cell_FACH with user equipment UE1 and UE2 in normal (Pre-Release 7) Cell_FACH whilst user equipment UE3 and UE4 are in Enhanced Cell FACH. M_REP is set to 64 (i.e. same as DTx_Forced_Cycle). It is assumed that the base station did not see the need to have non-common Measurement Occasion, that is the Additional_Offset variable in Equation 2 and Equation 5 are set to zero. Using Equation 2 and Equation 5, the following C_RNTI and H-RNTI are used (it should be noted that other values are possible):

| UE | C_RNTI | H-RNTI |
|---|---|---|
| UE1 | 198 | Not Relevant |
| UE2 | 326 | Not Relevant |
| UE3 | Not Relevant | 6 |
| UE4 | Not Relevant | 70 |

Base stations NB2, NB3 and NBA will perform similar C_RNTI and H-RNTI assignments. The base stations will also move their neighbours into the inter-frequency Cell Info List (if they are not already in this list). The user equipment will therefore start measuring these discontinuous base stations during their Measurement Occasions, thereby increasing the likelihood of a relocation occurring.

Reselection in Cell_PCH, URA_PCH and Idle Mode

In Cell_PCH, URA_PCH and Idle mode, the user equipment is in DRx mode and only wakes up during a Paging Occasion. The user equipment in these states perform measurements only during the Paging Occasion. The Paging Occasion is described in Equation 6, where it indicates the SFN in which the user equipment has to "wake up".

$$\text{Paging Occasion}=\{(\text{IMSIdiv}K)\bmod \text{DRX\_cycle\_length}\}+n*\text{DRX\_cycle\_length}+\text{Frame\_Offset} \quad \text{Equation 6}$$

Where: IMSI is the International Mobile Subscriber Identity of the UE—a unique identification number store in each mobile phone SIM; K is the number of available SCCPCH (Secondary Common Control Physical Channel); DRX_cycle_length is the DRx cycle measured in radio frames with a maximum value of 512 frames giving a maximum DRx cycle of 5.12 seconds—the DRx_cycle_length can be different for the idle state and non-idle state (Cell_PCH and URA_PCH)—in Idle state, the DRx_cycle_length is given by the core network whilst for Cell_PCH and URA_PCH it is specific to the UTRAN; n=0, 1, 2, ... maximum SFN value (i.e. 4095 in UMTS); Frame_Offset is a radio frame offset.

The Paging Occasion is a function of the IMSI, which cannot be controlled by the network. However, the network and base station is aware of the user equipment in Cell_PCH and is aware of their Paging Occasion. This can be used in determining the forced common "wake up" period such that the forced common "wake up" period also coincides with as many Paging Occasions as possible. The network can then provide information to the base stations to enforce additional "wake up" periods to increase the number of coinciding Paging Occasions.

For URA_PCH and Idle states, the base stations do not know whether a user equipment in either of these states is camped on (attached) to the base station. Similarly to Cell_PCH, the network can provide information to the base stations to enforce additional "wake up" periods to increase the number of coinciding Paging Occasions. The user equipment measures base stations transmitting during their Paging Occasions, thereby increasing the likelihood of a relocation occurring.

Enhanced Functionality User Equipment

Such enhanced functionality user equipment includes logic operable to determine a neighbouring base station's discontinuous transmission pattern. Such determination can be made in one of two ways. The first is that the user equipment itself senses the neighbouring base station's discontinuous transmission pattern, the second is that the network provides details of the neighbouring base station's discontinuous transmission pattern to the user equipment. It will be appreciated that both the sensed discontinuous transmission pattern and the details of the neighbouring base station's discontinuous transmission pattern are examples of information that can be used to adjust the user equipment's switching pattern. In particular, the user equipment attached to a base station that is performing DTx will come out of its DRx mode when its signal quality deteriorates below a threshold. The user equipment will then scan for a neighbouring base station's pilot and try to capture their DTx pattern. This procedure can be improved if the user equipment knows whether its neighbouring base station is performing DTx, its DTx cycle and the SFN (System Frame Number) offset. This information can be broadcast as part of the cell info list. This provides the advantage of better estimation of the neighbouring base station's pilot since the user equipment knows how many pilots to expect per unit time. Also, it is easier for a user equipment attached to a base station that is not performing DTx to measure and search for a base station that is performing DTx. Furthermore, the user equipment performing DRx can "wake up" at the right time to perform measurement of its neighbour base station that is performing DTx; this saves UE battery life. The user equipment can instantly participate in the new DTx cycle when it reselects to a NB that is performing DTx rather than wait till it receives a message from the base station.

Figure 10:
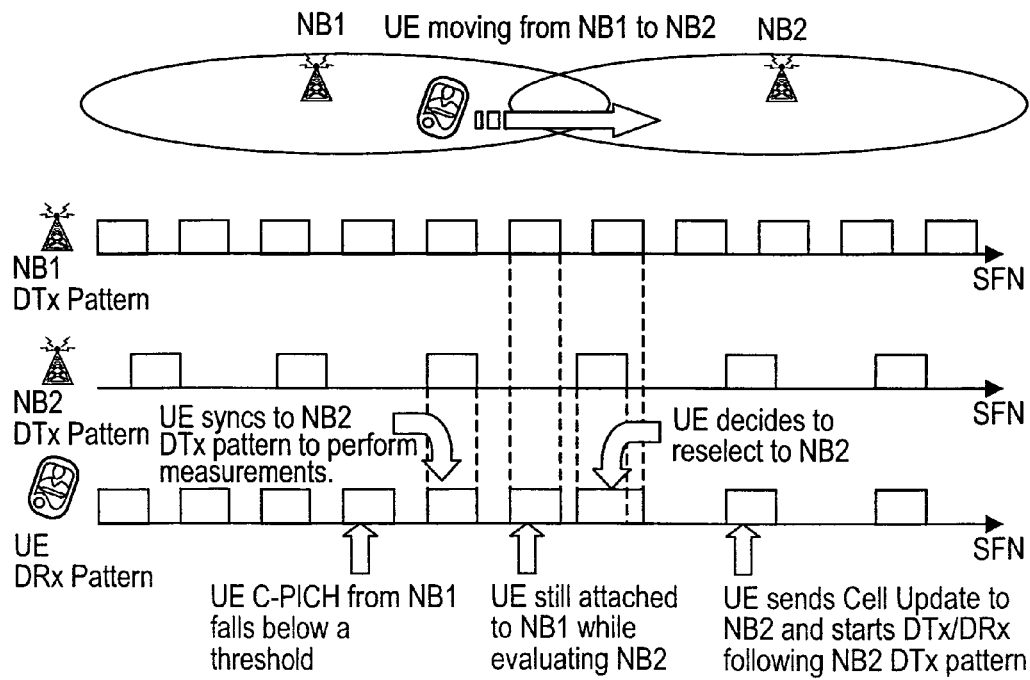
FIG. 10 illustrates an example arrangement where a user equipment adjusts its switching pattern to align with that of neighbouring base stations.

FIG. 10 shows how enhanced functionality user equipment (a base station discontinuous transmit aware user equipment) is able to make use of DTx patterns information of its neighbour base stations for mobility purposes. In this example, the user equipment is moving from the base station NB1 to the base station NB2 coverage area. The DTx pattern of base station NB2 is signalled to the user equipment (the SFN Offset and DTx cycle period). As the user equipment continues to moves closer to base station NB2, its signal quality (e.g. C-PICH) from base station NB1 drops below a threshold and it needs to look for a potential cell (base station coverage) reselect to. Since the user equipment is aware of the DTx pattern in base station NB2, the UE "wake ups" during base station NB2 "wake up" period to perform measurements on base station NB2 whilst still attached to base station NB1. Based on the measurements, the user equipment decides it needs to reselect to base station NB2 and it then performs cell reselection. Once the user equipment reselects to base station NB2, it sends a Cell Update to base station NB2 and proceeds to change its DRx (and DTx) pattern to that of base station NB2. By adjusting the switching pattern of the user equipment, the likelihood of a relocation occurring increases.

Accordingly, it can be seen that broadcasting information detailing a neighbour base station's DTx status (i.e. DTx pattern, DTx on/off and SFN offset) to user equipment aids the mobility process. In Cell_DCH, the network may transmit information to "wake up" an appropriate neighbouring base station from DTx to enable a user equipment that is suffering from poor signal, to perform measurement on this neighbouring base station. The network may select the base stations to "wake up" based on user equipment measurements (including measurements from DTx base stations) and positioning. The network may move the user equipment into Cell_FACH when it handovers to the neighbouring DTx base station to preserve the base station's DTx mode. In Cell_FACH, the network may transmit information to enforce a common "wake up" period on a set of base stations. In each of these base stations, the Measurement Occasion may be aligned to the common "wake up" period so that the user equipment can perform measurements on them. Intra-frequency base stations in DTx may need to be moved into the inter-frequency Cell Info List so that the UE will measure them during Measurement Occasion. In Cell_PCH, the network can use the Paging Occasion of these user equipment to find a common "wake up" time that has maximum overlap with the base station's DTx pattern. For URA_PCH and Idle states, information can be transmitted so that further "wake up" periods can be added to improve the probability that user equipment in these states, can measure the base stations performing DTx.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of controlling network nodes of a wireless communications network to facilitate relocation of at least a first network node, from connection with a second network node to connection with one of a plurality of neighbouring network nodes, said method comprising:
   determining when said first network node is configured to support wireless communication with said second network node; and
   wherein at least one of said network nodes is operable to switch, in accordance with an associated predetermined switching pattern, between an active mode of connection in which wireless communication is supported and a dormant mode of connection in which wireless communication is not supported;

providing information to adjust said associated predetermined switching pattern to improve a likelihood of supporting wireless communication between said first network node and said one of a plurality of neighbouring network nodes to thereby facilitate said relocation.

2. The method of claim 1, wherein providing information causes any switching patterns of at least one of said plurality of neighbouring network nodes to be adjusted to cause those neighbouring network nodes to remain in said active mode.

3. The method of claim 1, comprising:
establishing, from measurement reports received from said first network node, whether a strength of a wireless signal from said second network node has failed to achieve a predetermined threshold level; and
performing said steps of determining and providing information when said measurement reports indicate that a strength of wireless signals from none of said plurality of neighbouring network nodes exceeds said predetermined threshold level.

4. The method of claim 3, comprising:
factoring said strength of wireless signals from at least one of said neighbouring plurality of network nodes based on any switching pattern for that network node to determine whether a factored signal strength based on continued transmission in said active mode for that network node would exceed said predetermined threshold level and, if so, said step of providing information comprises providing information to adjust said associated predetermined switching pattern of that neighbouring network node.

5. The method of claim 1, comprising:
estimating, based on at least one of position information and a strength of wireless signals from said plurality of neighbouring network nodes, a set of said plurality of neighbouring network nodes located nearest to said first network node and said step of providing information comprises providing information to adjust said associated predetermined switching pattern of said set of said plurality of neighbouring network nodes.

6. The method of claim 1, comprising:
sending information to revert said associated switching pattern to their previous configuration of any of said plurality of neighbouring network nodes which were changed by said step of providing information and to which said first network node failed to relocate.

7. The method of claim 1, comprising:
transmitting information to cause said first network node and said one of said plurality of neighbouring network nodes to which said first network node relocated to adjust their switching patterns to align with the previous configuration of said associated switching pattern of said one of said plurality of neighbouring network nodes.

8. The method of claim 1, comprising:
establishing a common pattern of periods when at least one of said plurality of neighbouring network nodes is to be in said active mode and said step of providing information comprises providing information to adjust at least one associated predetermined switching pattern to include said common pattern of periods when said at least one of said plurality of neighbouring network nodes is to be in said active mode.

9. The method of claim 8, wherein providing information comprises providing information to adjust a switching pattern of said first network node to cause said first network node to be in said active mode during said common pattern of periods.

10. The method of claim 8, wherein providing information comprises providing information to manipulate an identifier of said first network node to cause Measurement Occasions to occur during said common pattern of periods.

11. The method of claim 8, comprising:
transmitting, in an Inter-frequency Cell Information List, details of those of said plurality of neighbouring network nodes sharing a frequency band currently being utilised by said first network node for wireless communication with said second network node.

12. The method of claim 1, comprising:
establishing paging occasions of said first network node and said step of providing information comprises providing information to adjust said associated predetermined switching pattern to include said paging occasions as periods when at least one of said plurality of neighbouring network nodes is to be in said active mode.

13. The method of claim 1, comprising:
establishing a predetermined switching pattern for at least one of said plurality of neighbouring network nodes and said step of providing information comprises transmitting an indicator indicative of said predetermined switching patterns to said first network node.

14. A non-transitory computer program product operable, when executed on a computer, to perform the method of claim 1.

15. A network node operable to control network nodes of a wireless communications network to facilitate relocation of at least a first network node from connection with a second network node to connection with one of a plurality of neighbouring network nodes, said network node comprising:
determining logic operable to determine when said first network node is configured to support wireless communication with said second network node, wherein at least one of said network nodes being operable to switch, in accordance with an associated predetermined switching pattern, between an active mode of connection in which wireless communication is supported and a dormant mode of connection in which wireless communication is not supported; and
provision logic operable to provide information to adjust an associated predetermined switching pattern to improve a likelihood of supporting wireless communication between said first network node and said one of a plurality of network nodes to thereby facilitate said relocation.

* * * * *